Figure 8:
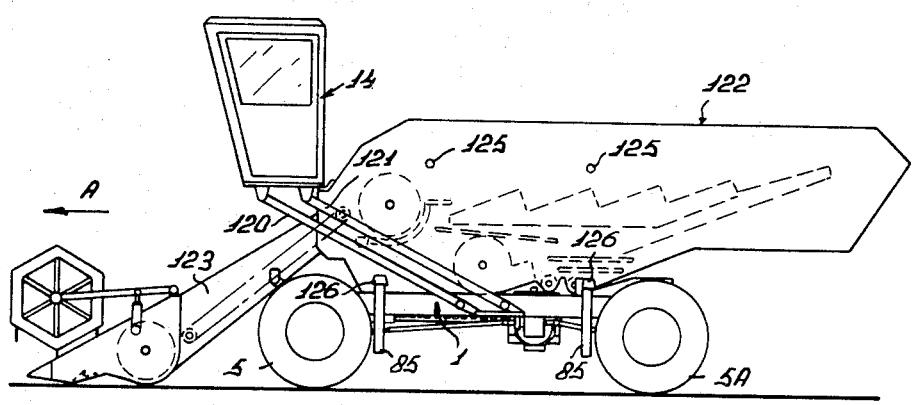

United States Patent [19]
van der Lely

[11] 3,720,047
[45] March 13, 1973

[54] UNIVERSAL TRACTORS

[76] Inventor: Cornelius van der Lely, 7 Bruschenrain, Zug, Switzerland

[22] Filed: Oct. 3, 1969

[21] Appl. No.: 863,576

[30] Foreign Application Priority Data

| Oct. 7, 1968 | Netherlands | 6814307 |
| May 28, 1969 | Netherlands | 6908076 |
| Aug. 7, 1969 | Netherlands | 6912024 |
| Sept. 23, 1969 | Netherlands | 6914378 |

[52] U.S. Cl. ............ 56/15.6, 56/228, 56/DIG. 9, 180/77 S, 182/2
[51] Int. Cl. ............................................ A01d 75/22
[58] Field of Search...182/2; 180/77 S, 89; 296/28 C, 296/35, 35 A; 56/21, 328 R, 228, 15.6, DIG. 9; 280/504

[56] References Cited

UNITED STATES PATENTS

| 2,376,541 | 5/1945 | Johnson et al. | 56/228 X |
| 2,491,354 | 12/1949 | Acton | 56/228 X |
| 2,616,768 | 11/1952 | Stemm | 56/328 R |
| 2,624,478 | 1/1953 | Kaplan | 180/89 X |
| 2,833,367 | 5/1958 | Pool et al. | 182/2 X |
| 2,846,096 | 8/1958 | Beyerstadt et al. | 180/89 X |
| 2,998,861 | 9/1961 | Hotchkiss | 182/2 |
| 3,319,739 | 5/1967 | Morse | 82/2 |
| 3,332,513 | 7/1967 | Wiebe | 182/2 X |
| 3,398,984 | 8/1968 | Ajero | 180/89 X |
| 3,451,574 | 6/1969 | Weichel | 180/89 X |

FOREIGN PATENTS OR APPLICATIONS

| 647,340 | 10/1957 | Canada | 182/2 |
| 87,011 | 3/1959 | Denmark | 180/89 |
| 989,301 | 9/1951 | France | 180/77 S |
| 1,167,774 | 11/1958 | France | 180/77 S |

*Primary Examiner*—Louis G. Mancene
*Assistant Examiner*—J. A. Oliff
*Attorney*—Mason, Mason & Albright

[57] ABSTRACT

A self-propelled vehicle has a driver platform pivotally coupled to its frame through one or more arms. The platform can be moved to occupy various positions to facilitate loading and handling. Various implements and other objects can be supported on or coupled to the vehicle by moving the driver platform to accommodate the objects. The entire loading surface supported by the frame can thus be used. Coupling members and lifting devices are mounted on the vehicle to assist in loading, unloading and connecting the objects.

15 Claims, 20 Drawing Figures

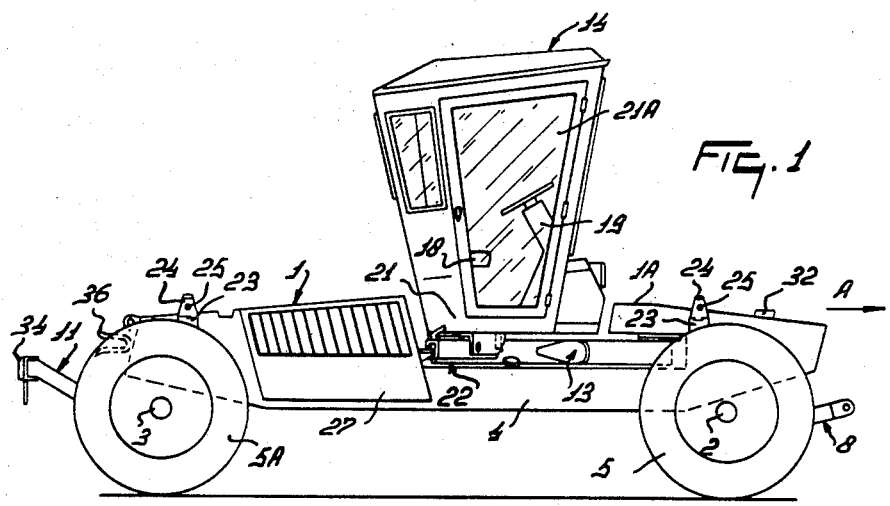
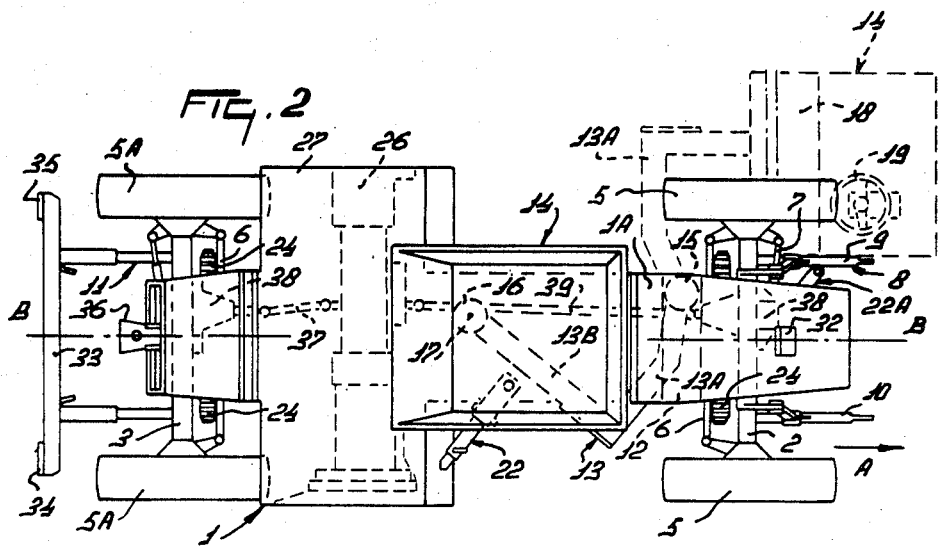

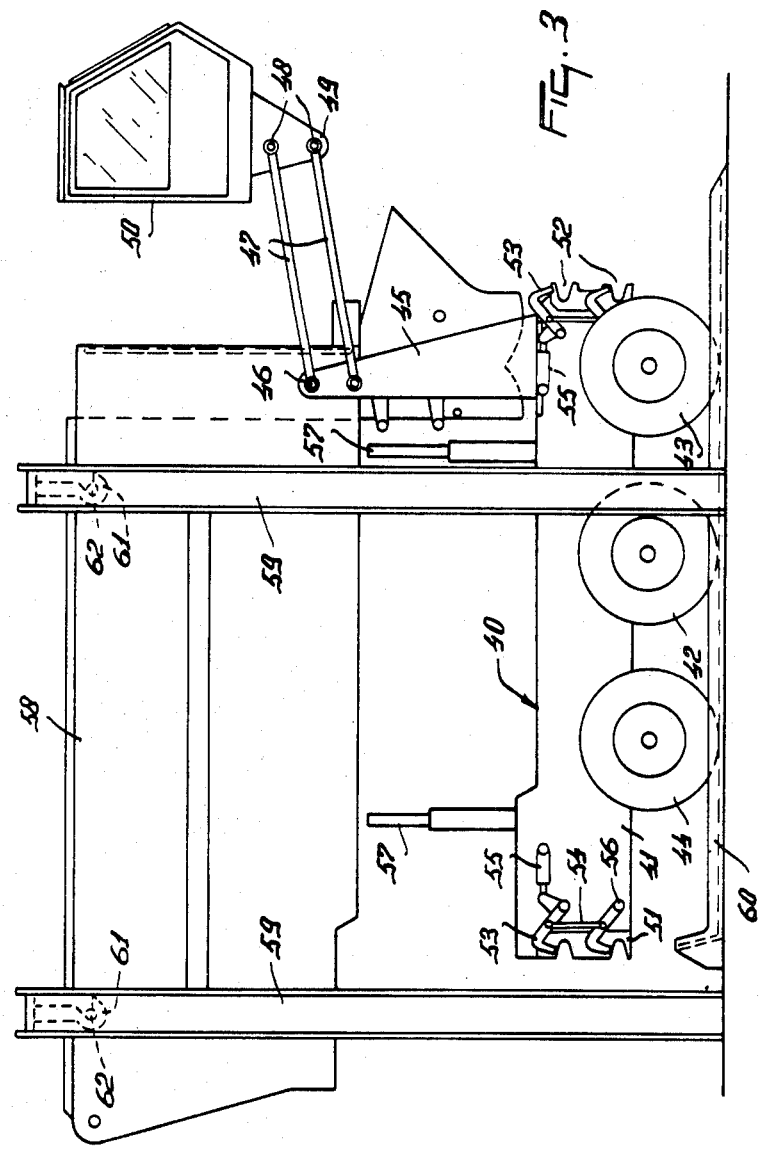

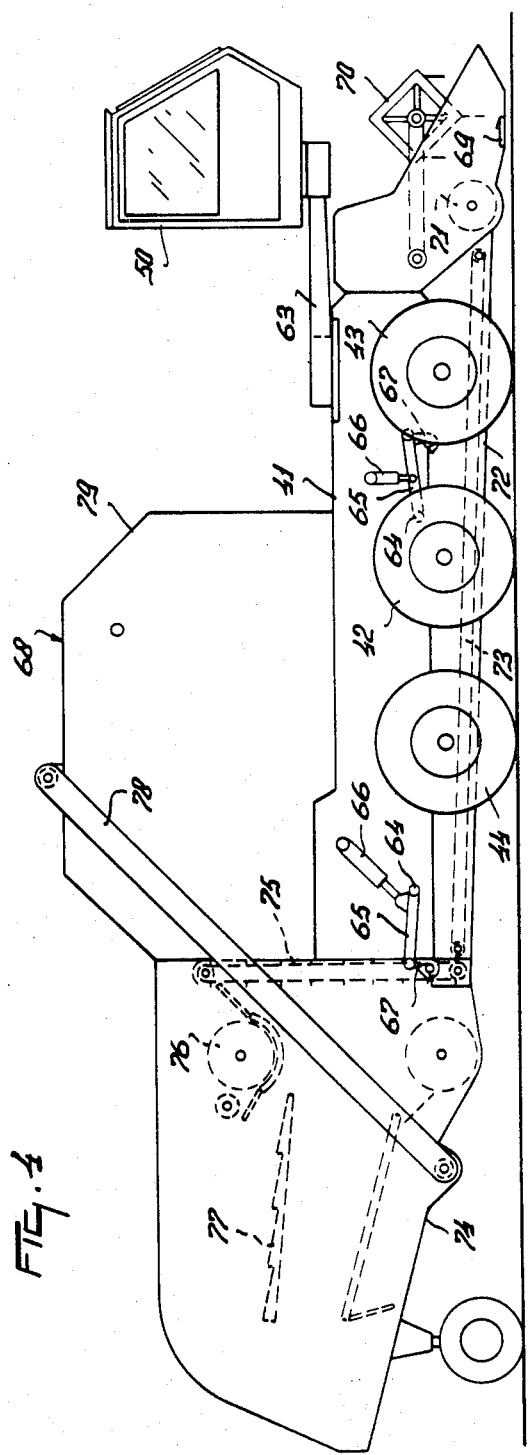

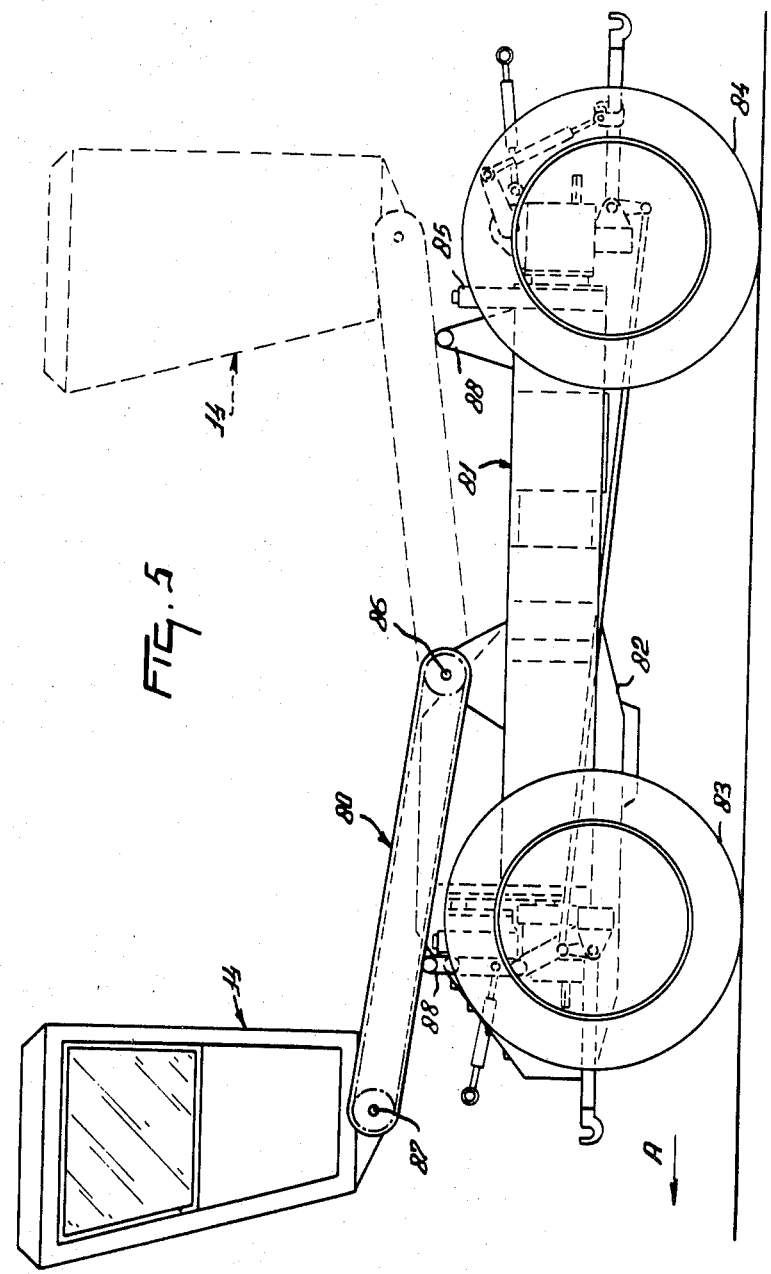

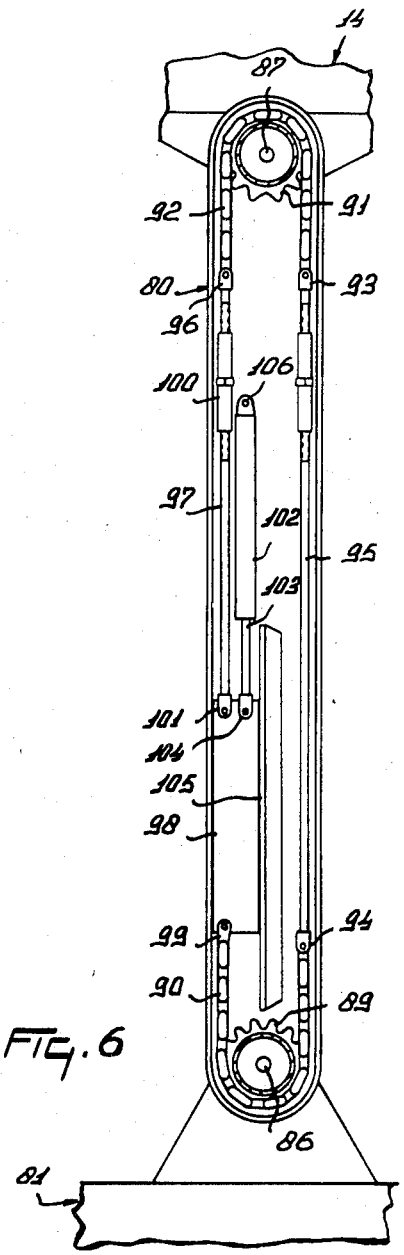

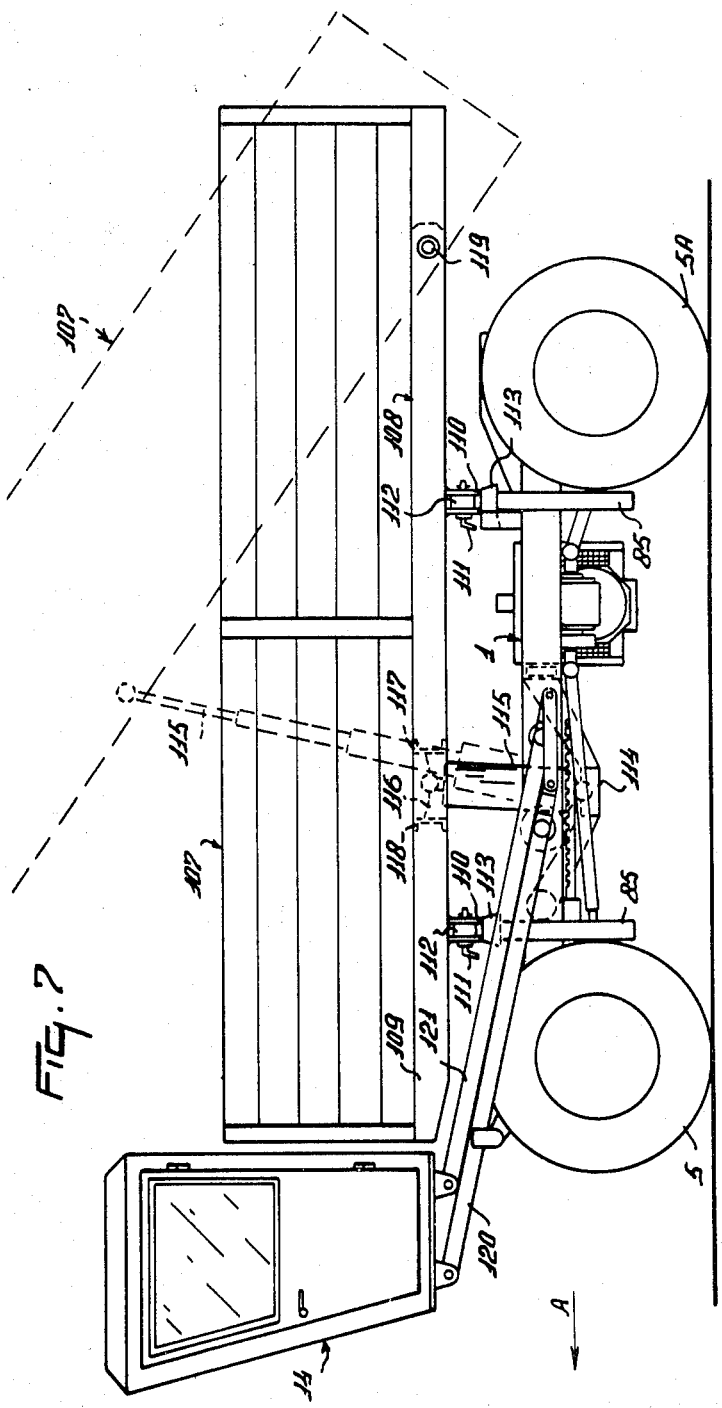

INVENTOR
CORNELIS VAN DER LELY

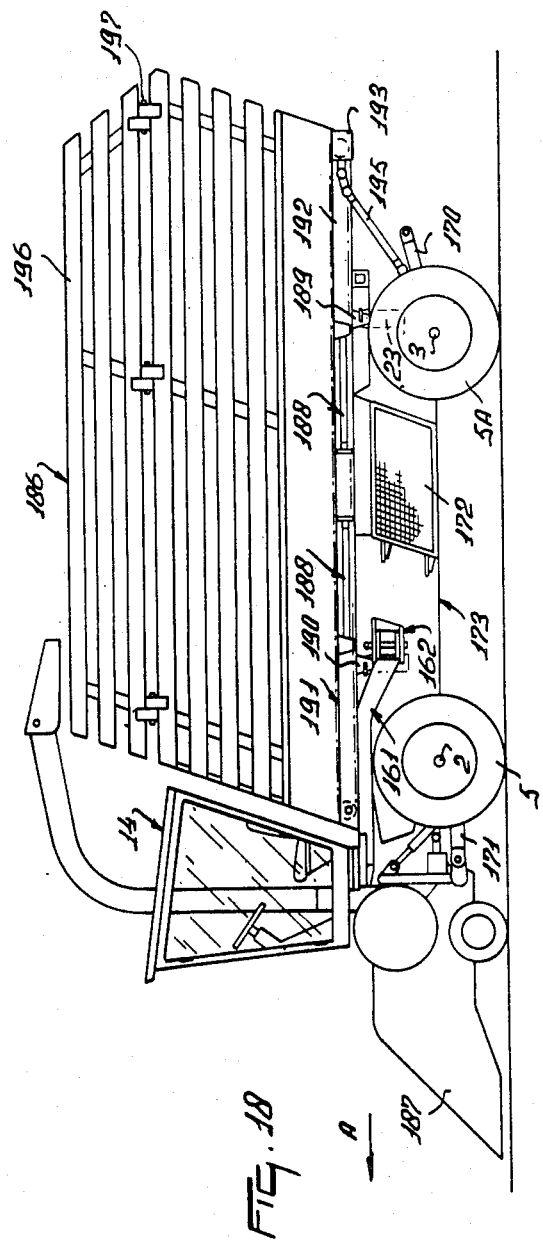

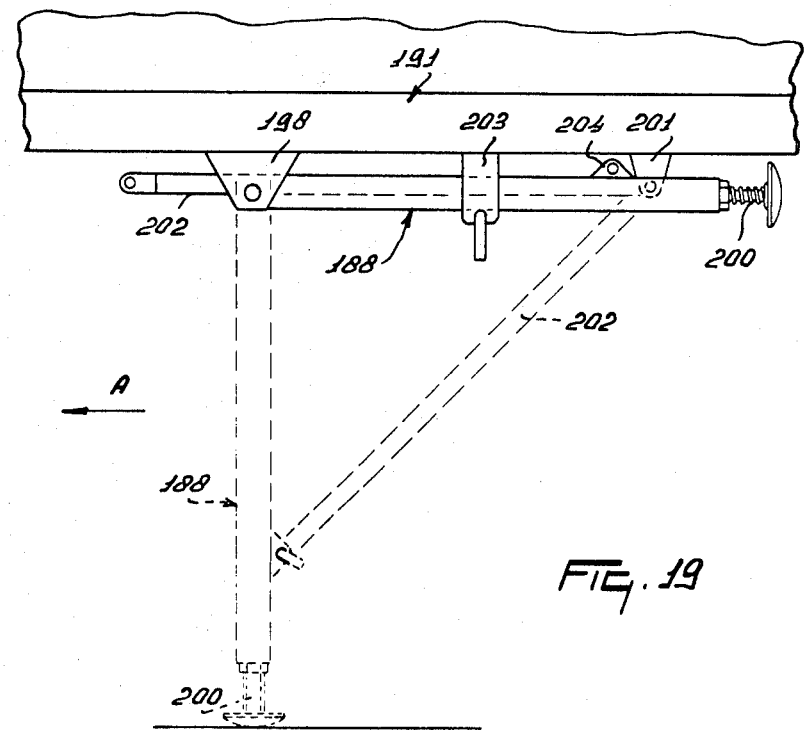

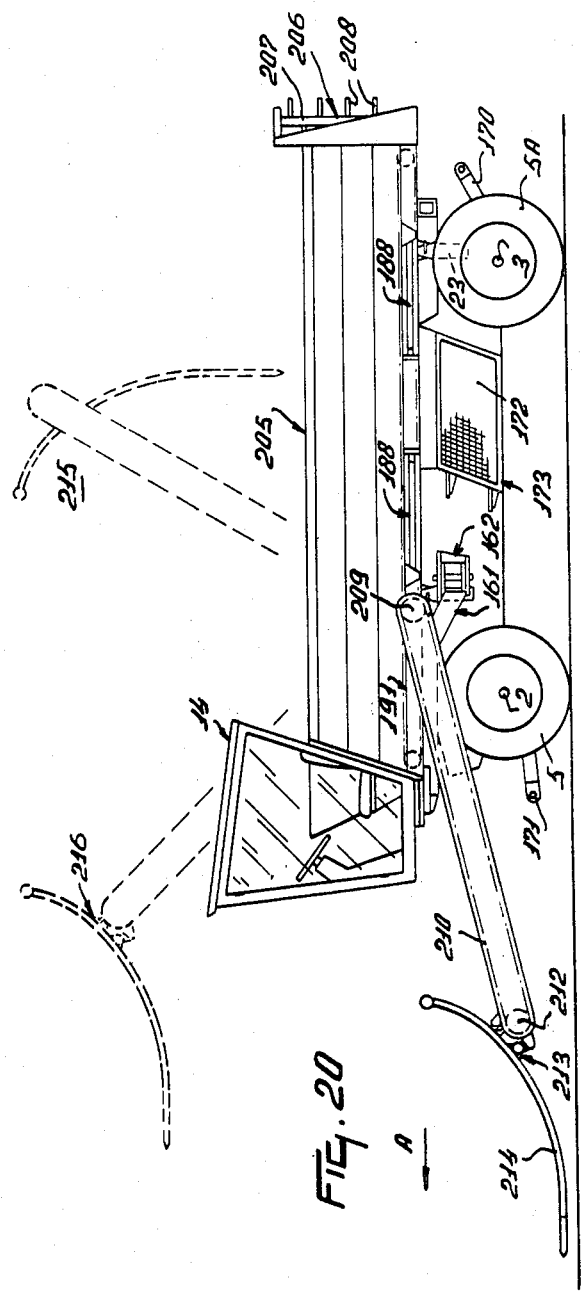

UNIVERSAL TRACTORS

The invention relates to a tractor or a similar self-propelled vehicle comprising coupling means by which a loading surface or an implement can be detachably arranged on the upper side of the tractor and comprising a driver's platform secured to the tractor and comprising tractor control-members.

In known tractors of the kind set forth the driver's platform with the tractor control-members such as steering device and braking device occupies a fixed position with respect to the tractor. Thus the possibilities of use of the tractor are restricted. Moreover, with respect to the tractor the driver's platform is sometimes arranged so that satisfactory supervision of the implements coupled with the tractor is not always possible. Object of the invention is to obviate the above-mentioned disadvantages and is characterized in that the tractor is provided with means by which the driver's platform with the control-members is adjustably positioned with respect to the tractor and can be fixed at will in two or more positions.

According to a further aspect of the invention the tractor or a similar prime mover comprising a frame for receiving or supporting agricultural implements or a loading surface arranged on the upper side of the tractor and comprising a driver's platform fastened to the frame is characterized in that the tractor comprises means with the aid of which the driver's platform can be displaced from the front end of the tractor towards the rear end thereof. This construction permits of forming a particularly advantageous combination of a tractor and one or more agricultural implements.

In a preferred embodiment a tractor or a similar prime mover comprising coupling means for fastening a loading surface and/or an implement on the upper side of the tractor is characterized in that the coupling device provided on the tractor comprises a lifting device for lifting the loading surface or the implement relatively to the tractor.

According to a further aspect of the invention the tractor or similar prime mover comprising a lifting device at its rear end is characterized in that the tractor is provided with a lifting device on its upper side.

In a preferred embodiment a tractor comprising two ground wheel axles, a driver's platform and an engine is characterized in that the driver's platform is arranged in front of the engine between the ground wheel axles.

For a better understanding of the invention and in order to show how the same may be carried into effect, reference is made by way of example to the accompanying drawings, in which further advantages and features of the invention will become manifest.

Figure 13:
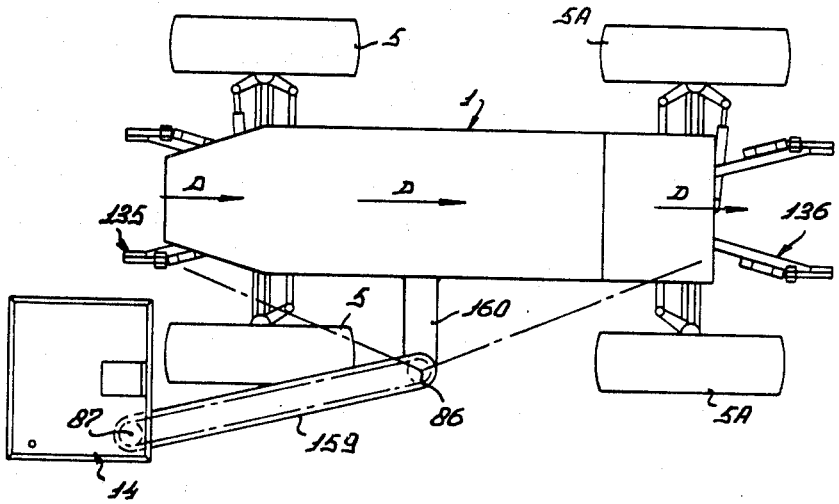
Figure 9:
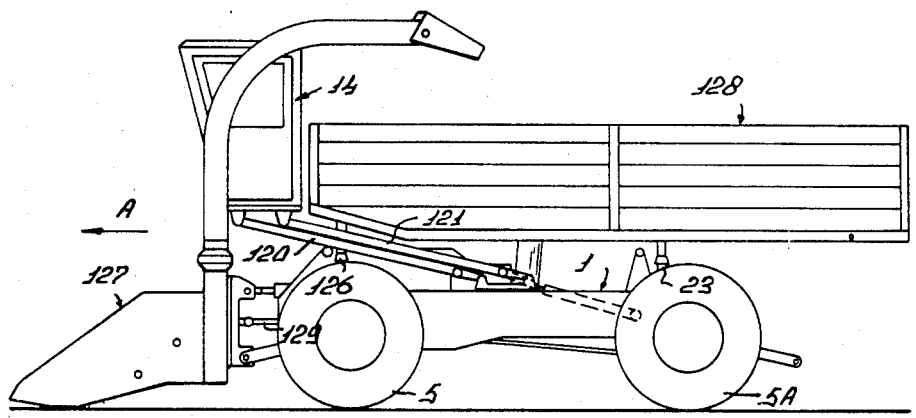
Figure 10:
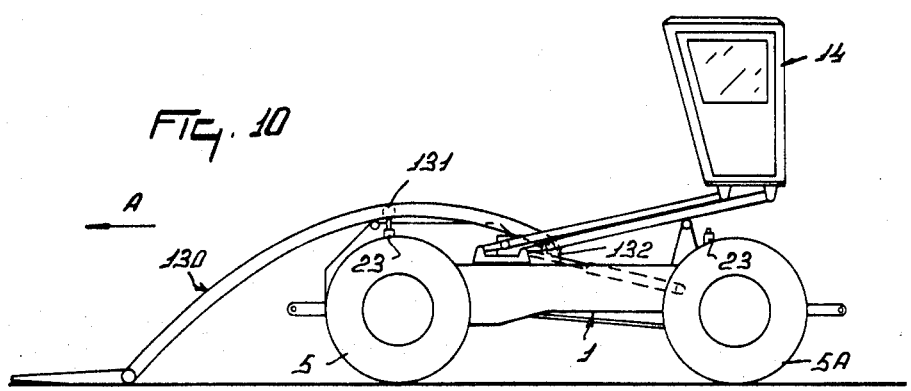
Figure 11:
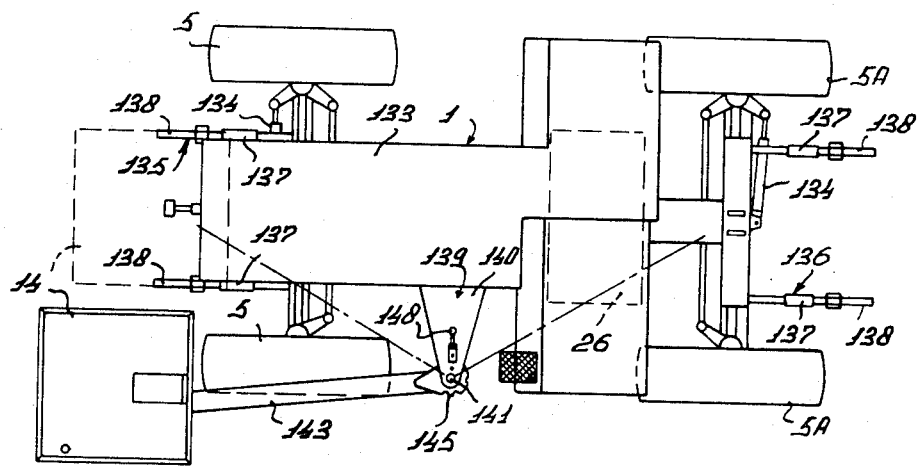
Figure 12:
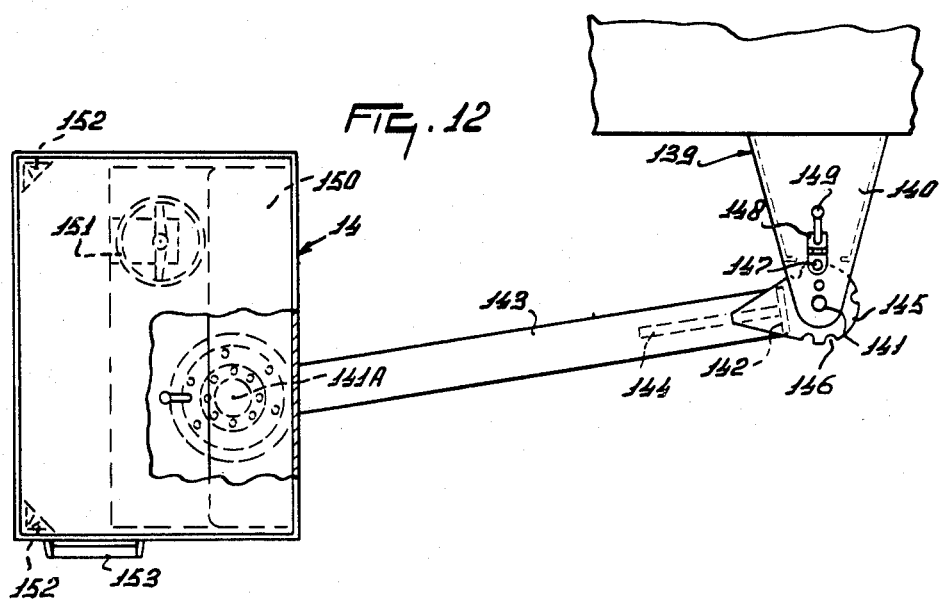
Figure 14:
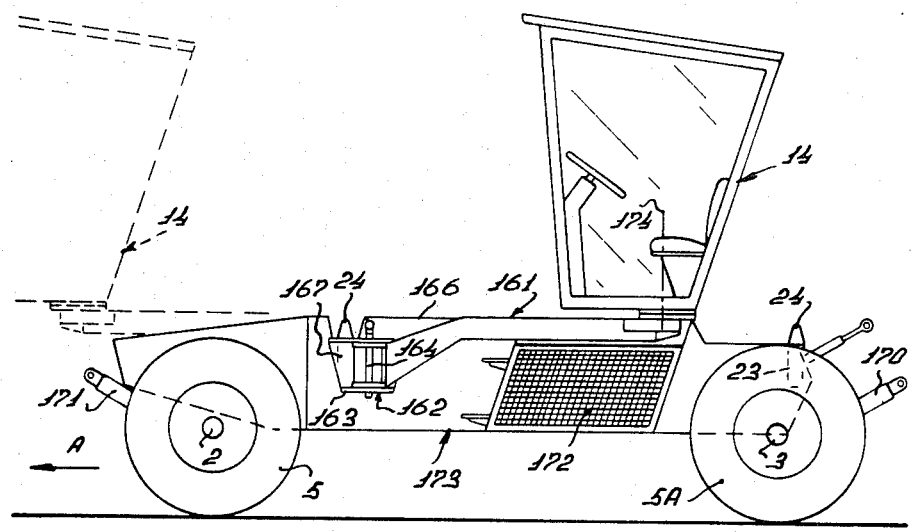
Figure 15:
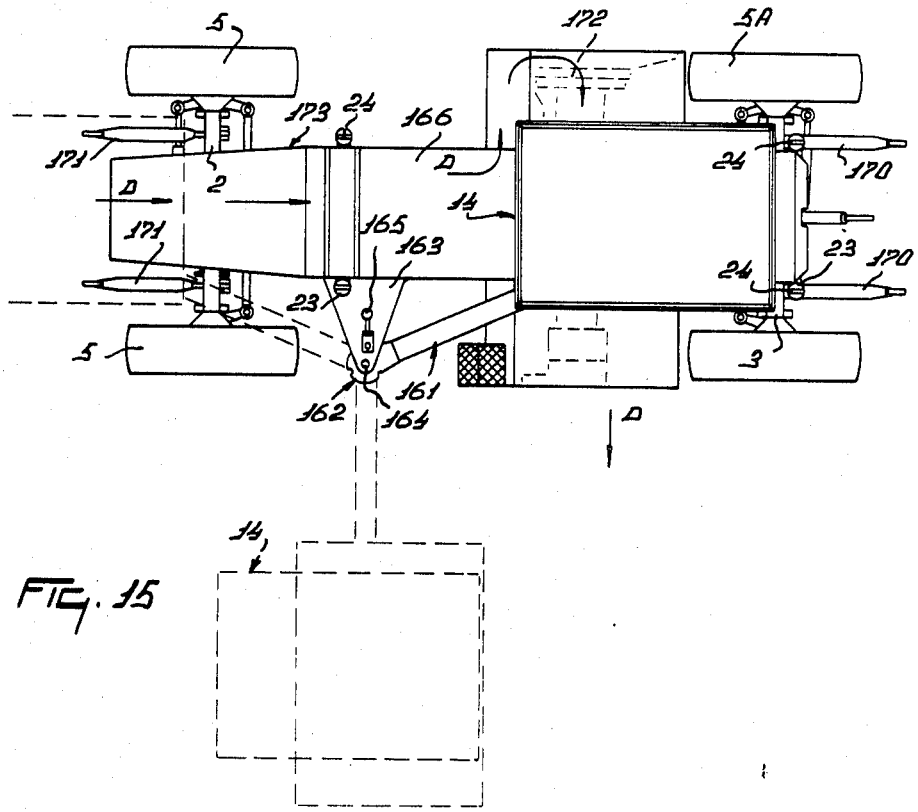
Figure 16:
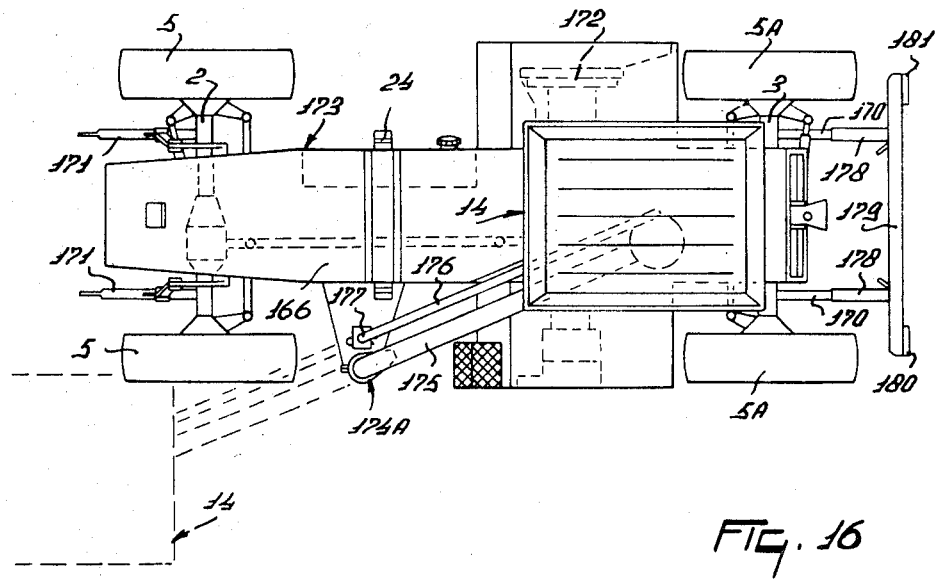
Figure 17:
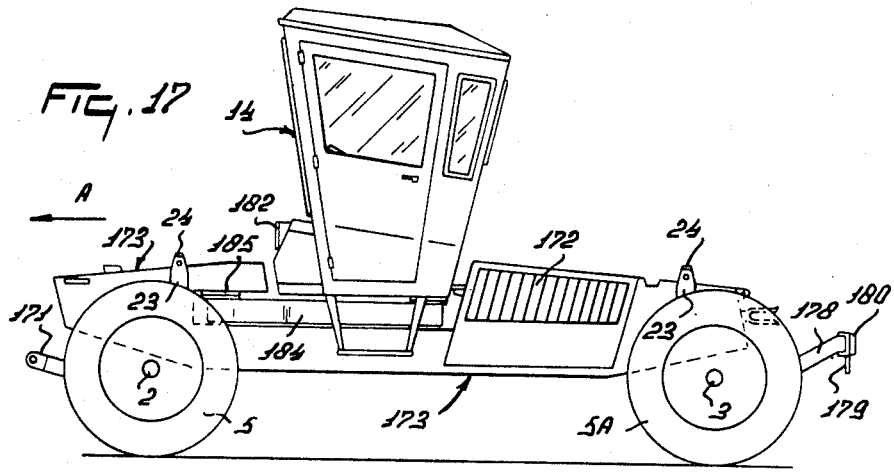

FIGS. 1 and 2 are a side elevation and a plan view respectively of a tractor in accordance with the invention, FIG. 3 shows the combination of a tractor and an implement, FIG. 4 shows the combination of a tractor and a combine harvester, FIG. 5 is a side elevation of a tractor in accordance with the invention, FIG. 6 is a partial sectional view of a chain drive device of the tractor shown in FIG. 5, FIG. 7 is a side elevation of a tractor on which a loading surface is arranged, FIG. 8 is a side elevation of a tractor comprising a combine harvester, FIG. 9 is a side elevation of a tractor comprising a loading surface and an implement attached to the front of the tractor, FIG. 10 is a side elevation of a tractor having a loading device attached to its front, FIG. 11 is a plan view of a tractor in accordance with the invention, FIG. 12 shows on an enlarged scale the arrangement of a pivotable arm for the driver's platform, FIG. 13 is a plan view of an embodiment of a tractor in accordance with the invention, FIG. 14 is a side elevation of one embodiment of a tractor in accordance with the invention, FIG. 15 is a plan view of the tractor shown in FIG. 13, FIG. 16 is a plan view of a tractor in accordance with the invention, FIG. 17 is a side elevation of a tractor in accordance with the invention, FIG. 18 is a side elevation of the combination of a tractor and a loading space and a maize harvester, FIG. 19 illustrates the construction of a supporting device for a loading surface or implement to be arranged on the tractor, and FIG. 20 is a side elevation of the combination of a tractor and a loading device.

The tractor 1 shown in FIGS. 1 and 2 comprises a frame 4, supported from axles 2 and 3 and which may be a self-supporting frame. The axles 2 and 3 are provided with wheels 5 and 5A respectively, which are all of the same size and can all be driven. The steering gear of the tractor 1 comprises the hindmost steering rods 6 and the foremost steering rods 7. The tractor is provided at the front with a two-point lifting device 8 having supporting arms 9 and 10, adapted to pivot around a horizontal shaft. On the rear side the tractor 1 is provided with a three-point lifting device 11. The frame of the tractor 1 comprises a frame beam 12, to which an arm 13 is pivoted, which in turn is pivoted to a driver's cabin 14. The arm 13 is formed in this preferred embodiment by a hollow beam, which is coupled with the frame beam 12 by means of a vertical pivotal shaft 15. Through the hollow arm 13, pipes, cables and the like (not shown) are taken, through which the steering device, the braking device and so on, forming the tractor control-means are connected with the tractor. At the other end 16 of the supporting arm 13 the driver's platform is arranged so as to be rotatable about a vertical shaft 17. A driver's seat 18 and a steering device 19 are disposed in the closed driver's cabin 14. This cabin has, in an advantageous embodiment, a rectangular roof, which is 1.5- to 2-times the size of the bottom surface 21 of the cabin. The window 21A of the cabin 14 has a larger width on the upper side than on the lower side. The driver's cabin is equipped with an air-conditioning system and a radio transceiver.

According to the invention the cabin 14 is arranged so as to be rotatable on the arm 13 and simultaneously pivotable around the pivotal shaft 15 so that, as is shown in the plan view of FIG. 2, the cabin can be moved into at least two positions in which the cabin is located above the tractor in the position shown in solid lines, whereas it is in the positions shown in broken lines at the front of the tractor. The frame beam 12 is provided with locking members 22 and 22A for fixing the driver's cabin in the two positions shown (see FIG. 2).

The tractor according to the invention is furthermore characterized by a vertically operating lifting device formed essentially by four steering cylinders 23. Two steering cylinders are arranged near the front axle and two steering cylinders are located near the rear axle of the tractor. As is shown in FIG. 2, two steering cylinders are located one on each side of the frame 4 approximately at the level of the frame beam 12. The steering cylinders 23 can be actuated hydraulically from the driver's seat 18 in a manner not shown and are provided with a quick-release coupling for fastening the loading surface or the implements.

In an advantageous embodiment locking members are provided near the upper ends of the steering cylinders 23, which members form part of the coupling means for a loading surface or an implement. These locking members are formed by fastening strips 24 having openings 25 for receiving a locking pin.

Between the axles 2 and 3 the driving gear of the tractor is arranged so that, in this embodiment, the engine is disposed in a direction transverse of the direction of travel A of the tractor.

The arm 13 comprises two portions 13A and 13B (see FIG. 2). The portion 13A of the arm is curved, whereas the second portion 13B is straight. It is advantageous to arrange the pivots 15 and 16 of the supporting arm 13 at a lower level than the upper side of the tractor. This results in a lower point of gravity and a lower construction of the tractor including the driver's platform. Owing to the particular structure of the supporting arm 13 the driver's cabin 14 can be easily turned towards the left-hand front side of the tractor so that the portion 13A of the supporting arm surrounds the wheel 5 of the tractor. It is furthermore advantageous to fasten the driver's cabin fixedly but slightly resiliently directly to the tractor frame in the locked position. For this purpose the locking device 22 comprises a spring member of slight stress.

The driver's cabin 14 is preferably attached resiliently in a manner not shown completely to the frame of the tractor 1 so that it is capable of deflecting resiliently in a vertical direction. At the front the tractor is provided with an additional supporting member 32, which is capable of holding part of an implement or loading surface arranged on the upper side of the tractor. At the rear end of the tractor the lifting device 11 is provided with a beam 33, the ends of which are provided with tail lights 34 and 35. The rear end of the frame of the tractor is furthermore provided with a draw hook 36 for drawing a wagon or the like.

The driving gear is driven by the engine 26 arranged on the other side in the tractor and drives equally via the pivotal shafts 37 and 39, the differential gears 38, the rear axle and the front axle of the tractor. The transversely arranged engine with drive permits of arranging the driver's seat 18 at a lower level and of obtaining a low-level point of gravity.

When the driver's platform occupies the position shown in FIG. 1, the tractor is intended to push or to pull implements. These implements may be attached to the lifting devices on the front and on the rear side of the tractor or they may be drawn by means of the drawhook of the tractor. The tractor may, however, also be employed when the driver's platform is in the position shown in broken lines in FIG. 2. In this case implements or a loading surface may be arranged on top of the tractor by means of steering cylinders 23, which will be explained more fully hereinafter with reference to a few further embodiments.

The tractor according to the invention has the advantage that large implements can be driven very effectively by the tractor, while they form a single unit with the tractor. The maneuverability is thus enhanced. The driver is furthermore able to satisfactorily supervise the working of the implements. The driver's seat 18 may be arranged in direct proximity of the operating implements. If, for example, a combine harvester is arranged as a unit on top of the tractor, the driver's platform may be located in the proximity of the mowing platform of the harvester.

Although the driver's seat 18 may be arranged in the plane of symmetry BB of the tractor, it is advantageous to arrange it asymmetrically on the right-hand side of the tractor, viewed in the direction of travel. In the position illustrated by broken lines the driver is nearer the implement attached to the front of the tractor so that he will have a good view of it.

It is particularly advantageous to provide the tractor in accordance with the invention with a loading surface so that the weight of the load bears directly on the tractor wheels. If as is shown in FIGS. 1 and 2, the driver's platform or seat has a width considerably smaller than the overall width of the vehicle with the loading surface, implements may be directly attached to the front side of the loading surface for feeding the material to the loading surface. These implements may be directly arranged in front of the foremost tractor wheels so that they can match the soil better. In addition the combination of tractor, loading surface and implement can thus be maneuvered more readily, while the ground pressure at the foremost tractor wheels is lower than in the case in which the implements are arranged further in front.

Particularly when the tractor has all-wheel drive and all-wheel steering, the combination described of loading space, loading device and tractor can operate under the most difficult conditions. It is particularly advantageous that in accordance with the invention the loading surface and any implements can be detached in a simple manner from the tractor, so that the tractor being free of the weight of a loading space can be employed as a simple tractor for soil cultivation, mowing or sowing. Owing to the adjustable arrangement of the driver's platform not only implements attached to the front of the tractor but also implements attached to the rear side thereof can be supervised and monitored effectively.

The frame 40 of the second embodiment of a tractor in accordance with the invention shown in FIG. 3 is provided at the rear end with an engine compartment 41 and may be formed by a hollow beam. The frame is supported from six ground wheels, the two central ground wheels 42 and the ground wheels 43 being connected with the frame so as to be movable in a direction of height. Advantageously the wheel groups 44 and 43 are steerable and/or drivable. As an alternative, the wheel group 42 may be driven.

Near the wheels 43 a horizontal beam lying transversely of the direction of travel and in the same plane as the upper side of the frame 40 is arranged so that its two ends project on either side above the frame. To the ends of this beam are secured supports 45 extending vertically upwards. Near the upper ends of the supports 45 two pivots lying one above the other 46 are provided, which extend horizontally and at right angles to the longitudinal direction of the tractor. Parallel arms 47 are rotatably fastened to the pivots 46 so as to extend forwardly. The front ends of the arms 47 are pivotally coupled with a support 49 by means of pivots 48, extending parallel to the pivots 48. The support 49 holds a driver's cabin 50, adapted to be turned about a vertical shaft and to be fixed in a plurality of positions, and comprising the tractor control-members. Obviously the driver's cabin shown in this Figure and the further Figures may be used as a driver's platform without walls. The pivots 46 and 48 are located at the corners of a parallelogram, while the arms 47 are not located in the same vertical plane so that the driver's cabin can be swung over a large range upwards and downwards and from front to rear. With respect to the tractor frame the arms 47 are adapted to be pivoted, for example, by means of a hydraulic adjusting cylinder (not shown), which can be actuated from the driver's platform.

At both ends the tractor is provided with projections 51, having V-shaped recesses 52, lying one above the other. Near the projections hooks 53 are pivotally secured to the frame. Two hooks 53, lying one above the other, are interconnected by a pivotal rod 54. The topmost hook 53 of each pair is coupled with a hydraulic steering cylinder 55, by means of which the hooks can be pivoted about the pivots 56. The implements to be employed in common with the tractor are preferably provided with bolts, which can be inserted into the recesses 52 and be locked by the hooks 53. The hooks 53 are preferably readily detachable and exchangeable for differently shaped lifting arms by which implements can be coupled with the tractor in a conventional manner.

At both ends of the tractor one or more power take-off shafts (not shown) are provided and adapted to be driven preferably with different speeds. In order to obtain a quick coupling of the implement, these power take-off shafts are preferably provided with claw couplings, which are adapted to co-operate with parts of claw couplings provided on the implements to be attached so that a driving connection for the implement is easily obtained. The tractor is furthermore provided with four vertical steering cylinders 57, whose piston rods, in the projecting position, extend above the tractor frame. The vertical cylinders are located near the sides of the frame. Two cylinders are arranged in the proximity of the engine compartment and two cylinders are arranged at the front end of the tractor.

Advantageous dimensions of the wheels supporting the tractor may be: diameter about 1 to 1.50 ms, width of one wheel 30 to 50 cms. Even if comparatively heavy implements are coupled with the tractor, a comparatively low ground pressure may thus be ensured. The engine power preferably lies between 100 and 200 HP. The width of the tractor is preferably 180 to 250 cms so that a stable position is obtained when broad implements are attached.

The actuation of the tractor can be performed from the driver's cabin 50. The ducts and cables required for the control may be passed through the preferably hollow arms 47, but as an alternative separate cables and ducts may be provided between the support 49 and the frame so as to be pivotally coupled both with the support 45 and with the frame 40 in a manner such that they do not hinder the turn or pivotal movement of the driver's cabin.

The driving mechanism is preferably constructed so that the tractor can travel in two directions with the same speeds. It is then advantageous that the driver's cabin can turn about a vertical shaft and be fixed in a plurality of positions so that the tractor driver may always have a good view in the direction of travel and on the implements coupled with the frame.

The implement 58 shown in FIG. 3 is arranged on the upper side of the tractor and can be coupled with the tractor by means of the steering cylinders 57 constructed as coupling means.

When the implement has to be removed from the tractor, the tractor is driven beneath a porch 59. In order to ensure a correct position of the tractor relative to the porch, guides 60 for the tractor wheels are provided. The implement 58 is then lifted by means of the hydraulic cylinders 57 and in the lifted position the hooks 61 fastened to the porch grip around pins 62 secured to the implement. After the piston rods of the cylinders 57 have been withdrawn, the tractor can be driven from beneath the implement. Then the driver's cabin 50 can be displaced in the direction of height and in the travelling direction so that the tractor may be used as such without an implement on top.

The tractor shown in FIG. 4 corresponds largely with the tractor shown in the preceding Figure. Corresponding parts are designated by the same reference numerals. At one end and on one side the tractor is provided with an arm 63, adapted to turn about a vertical shaft located on plan at the side of the frame. At the other end of the arm 63 a driver's cabin is arranged so as to be rotatable about a vertical shaft with respect to said arm and to be fixed in a plurality of positions.

The tractor is provided with arms 65, adapted to pivot about horizontal shafts 64 and to be turned by means of hydraulic steering cylinders 66. The ends of the arms 65 have pivoted to them hooks 67. In this Figure the tractor is shown in conjunction with an implement formed by a combine harvester 68. The mowing mechanism 69 and the reel 70 and a worm conveyor 71 of the harvester are arranged on the front side of the tractor. Behind the worm conveyor 71 a gutter 72 is provided which accommodates a conveyor belt 73. The gutter 72 extends throughout the length of the tractor between the wheels 44, 42 and 43 and beneath the frame 41 and is fastened to the tractor by means of hooks 67. The conveyor belt 73 joins the lower side of an implement portion 74, arranged on the rear side of the tractor, in which portion the threshing mechanism is accommodated. The crop conveyed by the conveyor belt 74 beneath the tractor is conveyed upwards by means of an elevator 75, arranged in the implement portion 74 and it is fed into a threshing drum 76. From the threshing drum 76 the crop arrives at a known sieve and cleaning mechanism 77. The threshed corn is fed by a conveyor 78 to a container 79, which is arranged on top of the tractor. In this way the tractor can support directly the container 79 so that a large quantity of corn can be stored while the low level of the point of gravity is maintained.

It is preferred to provide the tractors described above with several coupling points for attaching implements, for example, at the arms 53 or the hooks 67, which can be actuated by the steering cylinders 66, hinged to the frame.

Since the upper sides of the wheels are substantially flush with the top side of the tractor and since each wheel has approximately the same diameter, this tractor is particularly suitable for accommodating a loading surface or an implement extending at least partly above the tractor. The adjustable driver—s platform can be turned into and locked in an advantageous position.

The tractor shown in FIG. 5 is provided with only one arm which comprises chain casings 80 on both sides for supporting the cabin or the driver's platform 14.

The frame of the tractor shown in FIG. 5 is essentially formed by the supporting frame 81. This tractor construction comprises a comparatively heavy driving engine 82 having a power of 100 to 300 HP, and arranged at the front of the tractor.

The frame is held by two groups of two ground wheels 83 and 84 respectively, which are all adapted to be steered and driven.

At the corners of the supporting frame 81 in this embodiment hydraulically controlled screw jacks or lifting cylinders 85 are arranged for the vertical displacement of one or more loading surfaces or attached implements on the tractor.

The actuation is performed in the pivotable driver's cabin 14. In this embodiment the transverse shaft 86 is arranged approximately at the center of the supporting frame 81, while a transverse shaft or support 87 is fastened to the bottom side of the driver's cabin. The two shafts or supports 86 and 87 project over approximately one third of their length from both sides of the supporting frame 81. The ends of these transverse shafts or supports 86 and 87 have pivoted to them chain casings 80, the dimensions and thickness of which are such that a displacement of the driver's cabin with the driver inside from the front side of the tractor to the rear side and conversely can be readily performed. The front and rear of the supporting frame 81 are provided with supporting members 88, which serve essentially as supporting and stop means for the chain casings 80. The chain transmission proper is shown in FIG. 6. As is shown in this Figure the shaft or rod 86 is provided with a gear wheel 89, about which a chain 90 is passed. The shaft 87 of the driver's cabin is provided with a chain sprocket 91, along which a chain 92 is passed. The chain ends 93 and 94 of the chains 92 and 90 respectively are interconnected by a rod 95. It is advantageous for the rod 95 to be provided with adjusting means by which this rod can be lengthened or shortened. The end portion 96 of the chain 92 is coupled with a rod 97, which in turn is coupled via an adjusting arm 98 with an end portion 99 of the chain 90. The rod 97 is also provided with adjusting means 100 so that it can also be varied in length. The coupling point 101 of the rod 97 and of the adjusting arm 98 as well as the coupling point 99 of the chain 90 and said adjusting arm 98 are located on a line which coincides with the longitudinal axis of the rod 97. The sidewall of the chain casing 80 has furthermore fastened to it a hydraulic control-cylinder 102, the control-rod 103 is fastened to the arm 98. The fastening point 104 of the control-rod 103 is located at a given distance from the fastening point 101 of the rod 97. The adjusting arm 98, which is in this embodiment approximately rectangular, is adapted to move in the guide member 105. This guide member also forms part of the chain casing 80. The control-cylinder 102 is controlled from the driver's cabin 14. The fastening eyelet 106 is secured to the chain casing 80.

The operation of this chain transmission for the universal tractor is as follows:

When the oil is fed to or withdrawn from the hydraulic control-cylinder 102, the control-rod 103 is displaced. Thus the chain portions 90 and 92, fastened to the adjusting arm 98 and to the rod 97 are wound off the sprockets 89 and 91 respectively. Since the shafts 86 and 87 rigidly secured to the sprockets continue occupying relatively fixed positions, which means that also the teeth of the sprockets 89 and 91 remain in relatively fixed positions, the result of winding the portions of the chains 90 and 92 off the sprockets 89 and 91 respectively is that the chain casings 80 move out of the initial positions into the selected positions and the driver's platform maintains its positions relative to the direction of travel. This construction has furthermore the advantage that the movable parts are enclosed in a substantially dust-free manner. These advantageous embodiments permit the driver to supervise even work to be accomplished at a high level above the ground.

As is shown in FIG. 7, a loading space 107 is arranged above the tractor by means of a supporting frame 108, 109. This supporting frame is provided at suitable places with fastening means or eyelets 110, which can be coupled by locking pins 111 with the tractor. The coupling device 112 in this embodiment is provided with cup-shaped fastening means 113, which grip around the ends of the rods of the hydraulic cylinders 85 so that a ready attachment of the loading space to the tractor is ensured. Owing to the inclined walls of the fastening means 113 the ends of the hydraulic rods automatically find the centers of the fastening means so that they center themselves therein and the tractor gets into the correct position relative to the implement, which can thus be readily locked together. The tractor frame comprises furthermore a construction 114 comprising a pivotable, hydraulic, telescopic cylinder 115, which is connected with a beam 116. This beam, together with the transverse beams 117, 118, forms part of the supporting frame 108, 109. In order to pass the loading space 107 into the tilted position, oil is fed into the cylinder 115, which can be carried out from the driver's seat 14. As a result the loading space gets into the position shown in broken lines in FIG. 7, in which it turns about a shaft 119, extending transversely of the longitudal axis of the tractor. The supporting arms 120 and 121 are pivoted to the frame and to the driver's cabin 14 respectively, the pivotal points being located at the corners of a parallelogram.

FIG. 8 shows a construction of a universal tractor in accordance with the invention and a combine harvester 122 with elevator housing assembly 123 arranged on the tractor, the driver's cabin 14 being located at the front of the tractor. The combine harvester is driven by the tractor in a manner not shown. In this embodiment the combine harvester 122 is provided with stub shafts 125 by means of which the harvester 122 can be supported, when it is not attached to the tractor 1. The harvester 122 is provided with fastening means 126 for its attachment to the tractor 1. In order to remove the combine harvester 122 from the tractor 1 the driver's cabin is turned into a position further to the rear, after which the tractor can be driven away in the reverse direction after the harvester 122 has been deposited on the ground. It is not necessary to remove the mowing platform from the harvester. The attachment and the removal of the combine harvester can be performed within a very short period of time.

FIG. 9 illustrates an embodiment in which a forage harvester 127 is arranged at the front of the universal tractor 1 in accordance with the invention, while the tractor 1 is provided with a tiltable loading space 128. The drive of the forage harvester is obtained by means of the foremost power take-off shaft 129 of the tractor 1. The driver's cabin 14 is positioned at the side of the forage harvester 127. The driver can readily check the operation of the forage harvester. The forage harvester is arranged directly in front of the tractor wheels and in front of the loading trough so that the distribution of weight of the whole combination has a favorable effect.

FIG. 10 shows an embodiment in which the driver's cabin 14 is located further to the rear on the tractor. The tractor 1 is provided with a lifting shovel 130. This shovel is attached at its rear end by means of the hinge 131 to the frame of the universal tractor 1. By means of a pivotal connection 132 the shovel 130 is coupled with the foremost lifting cylinder 23. Thus the shovel 130 with a load can be lifted for bringing the load into a wagon or at a different place. Instead of a shovel, forks or other loading tools may be used.

The tractor and parts thereof shown in FIGS. 11 and 12 comprise an arm adapted to pivot around a vertical shaft and supporting the driver's platform. The tractor comprises a frame 133, which is supported from four ground wheels 5 and 5A. Two pairs of ground wheels 5 and 5A are adapted to be steered with the aid of steering cylinders 134. All ground wheels 5 and 5A, which are of the same size as shown in FIGS. 11 and 12, can be driven by an engine 26, which is located between the wheels 5 and 5A.

At the front and at the rear the tractor is provided with a three-point lift 135 and 136 respectively. The lower arms 137 of each three-point lift are provided at the upper end with pivotable hooks 138, which can be actuated by a hydraulic steering cylinder (not shown). The implements can be attached in this way from the driver's cabin 14 of the tractor 1. The tractor is provided on one side near the center with a support 139, extending transversely of the direction of travel and having its sides 140 (see FIG. 12) extend approximately in a horizontal direction. On the side of the support remote from the tractor a fork-shaped part 142 is arranged by means of a vertical shaft 141 between the sides 140, said part having secured to it an arm 143, which initially extends upwardly and otherwise horizontally. A support 144 is fastened between the lower end of the fork-shaped part 142 and the arm 143.

The limbs 145 of the fork-shaped part 142 have a circular shape on the side remote from the arm 143 (FIG. 12). Along the circumference of the circular portion recesses 146 are provided which can be locked by a shaft 147 relative to support 139 with bracket 148 and pin 149. The driver cabin 14 comprises a driver's seat 150 and control-members such as the steering device 151, which is arranged so as to be pivotable together with the driver's seat 150. The driver's cabin is furthermore equipped with a television receiver (not shown) and a radio transceiver system. The cabin is furthermore provided with an air-conditioning system 152, which is shown schematically. On one side the driver's cabin 14 is provided below with a pivotable step 153. The steering device 151 in the driver's cabin 14 and furthermore control-members for the tractor are coupled by connecting members with the components of the tractor to be actuated. The connecting means are effectively passed through the hollow arm 143.

The tractor described above may be employed for many different agricultural operations. The cabin 14, which is adapted to be turned in a horizontal plane by means of the pivotable arm 143 and which holds the driver's seat 150, can be moved into different positions.

FIG. 13 shows a tractor in accordance with the invention, which is constructed essentially like the tractor described in the foregoing. With this tractor also four equally-sized ground wheels 5 and 5A are adapted to be steered and driven in the same manner. The tractor is also provided at the front and at the rear with three-point couplings 135 and 136 respectively. In this embodiment the driver's cabin 14 is connected by a pivotable arm 159 with a support 160 near the center at the side of the tractor so as to be pivotable about a vertical axis. This arm accommodates a chain structure like that described with reference to FIG. 6. The driver's cabin thus remains directed to the front by its front side during the pivotal movement of the arm. In this embodiment the center line of the engine lies in a plane symmetric to the tractor.

FIGS. 14 to 17 show embodiments of a tractor or a similar self-propelled vehicle in accordance with the invention, in which the driver's cabin is also displaceable with respect to a given point of the tractor.

As is shown in FIGS. 14 and 15 the driver's cabin 14 is fastened by its lower side to a supporting arm 161 so as to be rotatable, which arm can be connected and locked in position on the tractor by means of the vertical pivot 162 and a supporting beam 163.

According to the invention the upper side of a loading surface 166 of the tractor is suitable for accommodating agricultural implements or a loading trough. The tractor is provided with a lifting device, which comprises in an advantageous embodiment four hydraulically actuated cylinders, two in the front 167 and two in the rear (not shown). The hydraulical cylinders at the rear are located near the rear axle 3 of the tractor, whereas the hydraulic cylinders 167 are located near the front axle 2 of the tractor. In an advantageous embodiment the hydraulic cylinders of the lifting device are provided with projections, which are adapted to co-operate with the implement or loading trough to be fastened to the tractor. At the front and at the rear of the tractor a lifting device is provided. At the rear the tractor is provided with a three-point lifting device 170 and at the front a two-point lifting device 171. In an advantageous embodiment of the invention the engine 172 and the driving system (not shown) of the tractor 1 are surrounded by substantially closed walls 173. It is advantageous for the average wall height to be smaller than the average width of the tractor, whereas the average length of the tractor is approximately five- to seven-times the wall height. It is furthermore advantageous to arrange the engine 172 transversely of the direction of travel of the tractor, the engine 172 being located nearer the backwheels 5 than the front wheels 5A.

In this advantageous embodiment the driver's cabin 14 is adapted to turn about two vertical shafts, which are fastened to the two ends of the supporting arm 161.

As is shown in FIG. 16 the driver's cabin 14 of the tractor is provided with a supporting device 174A, which comprises in this embodiment a parallelogram structure adapted to be pivoted about vertical shafts. The rod 175 forms the essential arm of the driver's cabin 14, whereas the thinner rod 176 serves as a control-rod of the parallelogram. As is shown in FIG. 16 the turn of the driver's cabin from the rearmost position to the foremost position requires the control-rod 176 to be removed from its point of rotation 177 in the central position. The driver's cabin 14 can thus be turned through an angle of more than 180°.

The cabin itself comprises a second locking device (not shown) by means of which the driver can fix in position the cabin with respect to the tractor frame. On the rear side of the tractor the lifting device 178 is preferably provided with a beam 179, extending transversely of the direction of travel and provided with tail lights 180 and 181. In this way implements or a loading trough may be arranged on top of the tractor without the need for each implement to be provided with tail lights. Also in this embodiment the four wheels 5 and 5A of the tractor can be driven and steered, whilst all wheels are of the same size.

As is shown in FIG. 17, the driver's cabin 14 is located, viewed in the direction of travel A, in front of the engine 172 of the tractor. In this embodiment the driver's cabin 14 is arranged on a supporting arm 184, which is fastened to the tractor by a pivotal connection 185, which is located near the front axle 2 of the tractor 1. In this embodiment the pivotal joint 185 is located beneath the upper side of the tractor. By the arrangement of the driver's cabin 14 in front of the engine 172 the overall height of the tractor inclusive of the driver's cabin is lower than that of the tractor described above. The lower side of the driver's cabin 14 is located at a lower level than the upper side of the engine-house 27. The head lights 182 are arranged so as to be pivotable together with the cabin 14.

As is shown in FIG. 18, a loading trough constituting a loading surface 186 is arranged on the tractor 1 for collecting the cut material fed from a corn harvester arranged at the front of the tractor. The corn harvester 187 is coupled by means of a triangular rod system with the two-point lifting device 171. The loading trough constituting a loading surface 186 is provided in accordance with the invention with supporting means 188 for holding the loading trough directly on the ground when it is disengaged from the tractor 1. The loading trough is furthermore provided with locking means 189. The latter are formed mainly by a locking tag 190 and a component adapted to co-operate with the former and arranged on the tractor at the side of the lifting cylinder 168. The loading trough constituting a loading surface 186 is furthermore provided in accordance with the invention with a rolling floor 192, which can be driven via a drive 193 and a pivotal shaft 195 by the power take-off shaft of the tractor. It is preferred to use an embodiment of the loading trough the upper part 196 of which is adapted to be tilted about a horizontal shaft 197 downwards in a manner such that the height of the loading trough 186, when the part 196 is tilted down, is approximately equal to the height of the upper side of the cabin and amounts to about 230 cms.

As is shown in FIG. 19 a lower frame beam 191 of the loading trough constituting a loading surface 186 is provided with plates 198, to which a rod 188 is pivoted, which is provided with a supporting part 200, adjustable by means of a screw. At a given distance from the fastening plates 198 a second plate 201 has a second rod 202 pivoted to it. The frame beam 191 is provided with a locking device 203, by means of which the rods 188 or 202 can be fixed in a horizontal position, when they are out of use. The supporting rod device 188 of the loading trough 186 can be turned downwardly, when the loading trough constituting a loading surface has to be removed from the tractor. For this purpose the rod 188 is moved into the position indicated by broken lines, whereas the rod 202 is locked by its end in the locking tag 204. This position can be obtained after actuation of the hydraulic system of the lifting cylinders and after the loading trough constituting a loading surface 186 has been elevated with respect to the tractor. When the loading trough is held by the supporting means 188, the tractor 1 can be driven away from beneath the loading trough.

FIG. 20 shows that the tractor is provided with a loading trough 205, constituting a loading surface, which is provided at the rear with a spreading device 206, by means of which the material contained in the loading trough can be distributed on the rear side. In an advantageous embodiment this spreading device is formed by distributing members 208, adapted to rotate about vertical shafts 207. At the front, at about one third of the length, the loading trough 205 is provided with a shaft 209, to which is pivoted a supporting arm 210 one each side respectively, which arm is structurally identical to that shown in FIG. 6. The ends of the arms 210 remote from the shaft 209 are pivotally coupled with a second transverse shaft 213, to which a shovel 214 is fastened. Since consequently the shovel 214 is connected in the same manner with supporting arms of a structure equal to that of the arms shown in FIG. 6, the shovel 214 remains substantially in the same horizontal initial positions when the arms formed by cabin housings are turning about the shaft 209 from the front side to the rear side of the tractor. In this advantageous embodiment the shovel 214 is provided with a locking device 216, by means of which the shovel can be emptied at the delivery place 215. This locking device 216 is also hydraulically actuated from the driver's cabin 14.

With the tractor in accordance with the invention the front part of the tractor forms a channel for cooling air to the engine in the hind part. This has the advantage that the engine will not be soon soiled since the air channel has a great length.

The invention provides a tractor which is suitable due to its construction for use as a normal tractor for drawing or pushing implements or apparatus and in addition the tractor is suitable for carrying implements or a loading surface. When the driver's platform is located approximately at the center of the tractor a satisfactory supervision of implements attached to the front or the rear of the tractor is ensured, while the point of gravity of the tractor may lie on a low level.

What we claim is:

1. A self-propelled agricultural tractor with alternative implement attachments comprising a wheeled frame, having front wheels and rear wheels, an engine and a loading area on the upper side of said frame, coupling means for detachably securing any selected one of a plurality of implement attachments over said area to said frame, and a plurality of spaced apart lifting devices on said frame to raise and lower said attachments over said frame, a driver platform with tractor driving controls pivotally connected to said frame and turnable about at least one axis with arm means, said arm means being pivotable relative to said frame and said platform, and said platform being displaceable from a central position over said frame to a position forward of the front wheels, at least in part, and supporting means provided on said tractor to fix said driver platform in either of said positions, at least one lifting hitch at each end of said tractor, one of said lifting hitches being located at the front end and a second of said lifting hitches being positioned at the rear end thereof, to facilitate in the mounting and operation of said attachments.

2. A vehicle as claimed in claim 1, wherein said driver platform is pivotable about at least one upwardly extending shaft and said shaft connects said frame to said platform.

3. A vehicle as claimed in claim 1, wherein said driver platform is pivotable relative to said tractor about two substantially vertical shafts and said shafts comprise the ends of said arm means which interconnects said driver platform with said frame.

4. A vehicle as claimed in claim 1, wherein said frame is supported on four wheels of approximately the same diameter.

5. The tractor of claim 1, wherein said arm means includes a plurality of spaced apart arms pivotable about horizontal axes.

6. A self-propelled agricultural tractor with a plurality of alternative implement attachments comprising an engine, a frame supported on front wheels and rear wheels, and a loading area on the upper surface of said frame, coupling means on said frame for detachably securing a selected one of said plurality of alternative attachments over said area, said attachments having lower frame beams with fastening means secured to the beams, said coupling means comprising releasable locking means that secures the attachments to the tractor frame, a plurality of spaced apart vertically movable lifting devices supported on said frame, said lifting devices being seatable in the fastening means of said attachment's frame beams and movable upwardly and downwardly to raise and lower the attachments into and out of working position, at least one power take off shaft connected to said engine and said shaft being connectable to said attachments to operate same, said attachments having ground supports for sustaining same in elevated non-operative position, and the loading area of said frame being movable underneath the attachments for connection to same.

7. The tractor of claim 6, wherein said attachment is a loading space which is pivotally connected to said frame beams and movable to a tilted position.

8. The tractor of claim 6, wherein a power take off shaft is mounted at each end of said tractor.

9. The tractor of claim 6, wherein one of said attachments comprises crop pick up means which extends in front of said frame and a loading space is positioned over said frame.

10. A tractor as claimed in claim 6, wherein an agricultural implement attachment is supported on the upper portion of said tractor by said frame and one of said lifting devices is connected to a mowing and pick-up mechanism, a conveyor located beneath said tractor for moving processed crop towards the rear.

11. A self-propelled agricultural tractor with a plurality of alternative implement attachments, comprising an engine, a frame supported on front wheels and rear wheels, and a loading area on the upper surface of said frame, coupling means on said frame for detachably securing a selected one of said plurality of alternative implement attachments over said area to said frame, said attachments and said coupling means on the frame of said tractor having cooperating locking means for fixing the attachments in operative position to the frame of said tractor and said locking means including recesses and pivotable hooks on said fame, said hooks pivoting over said recesses for receiving and locking cooperating parts of the attachments in operative position to said frame, a plurality of spaced apart vertically movable lifting devices being movable upwardly and downwardly to raise and lower the alternative alternative attachments relative to said frame of the tractor.

12. The tractor of claim 11, wherein said hooks are connected to one another in pairs with rod means and movable in common.

13. The tractor of claim 12, wherein said pairs of hooks are pivotable about horizontal axes and a hydraulic cylinder is connected to said hooks to pivot same.

14. The tractor of claim 13, wherein said hooks are mounted on the front and the rear of said frame.

15. The tractor of claim 11, wherein said vertically movable lifting devices are mounted on the front and the back of said frame and a driver platform is pivotally connected to the front of said frame and displaceable to a position in front of said frame when the tractor is viewed in plan.

* * * * *